L. R. GRUSS.
AIR SPRING.
APPLICATION FILED SEPT. 6, 1916.
1,216,254. Patented Feb. 13, 1917.
2 SHEETS—SHEET 1.
Fig.1. 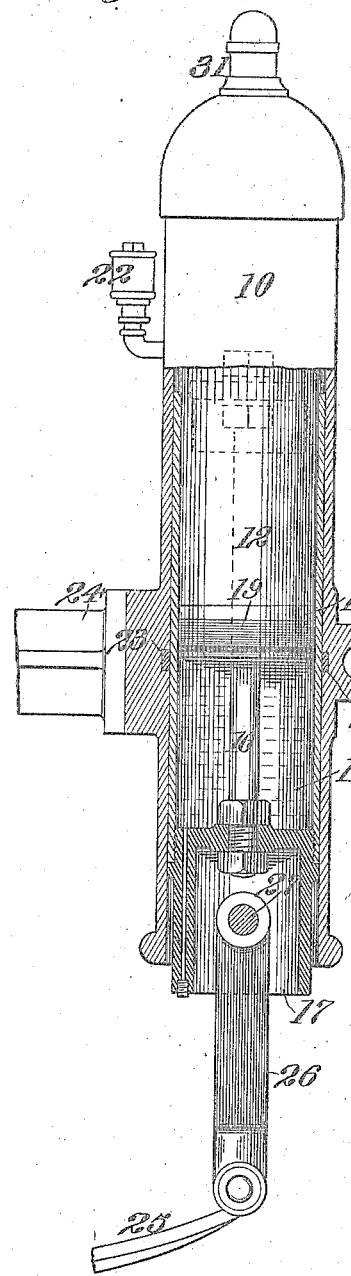 Fig.2. 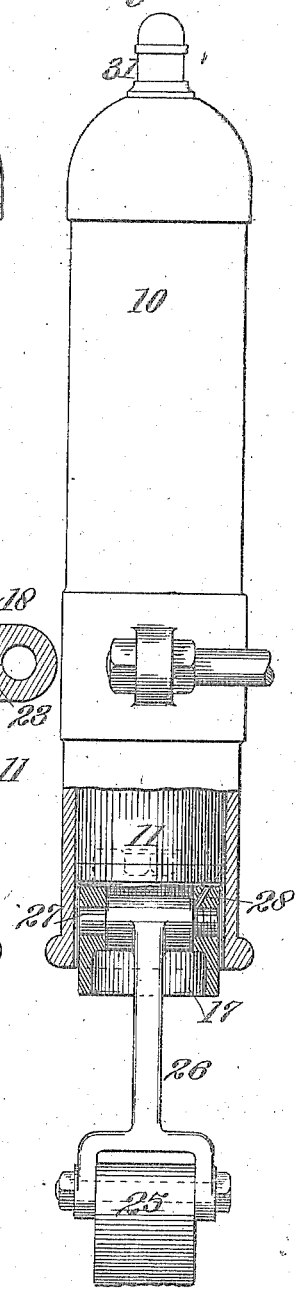 Fig.3. 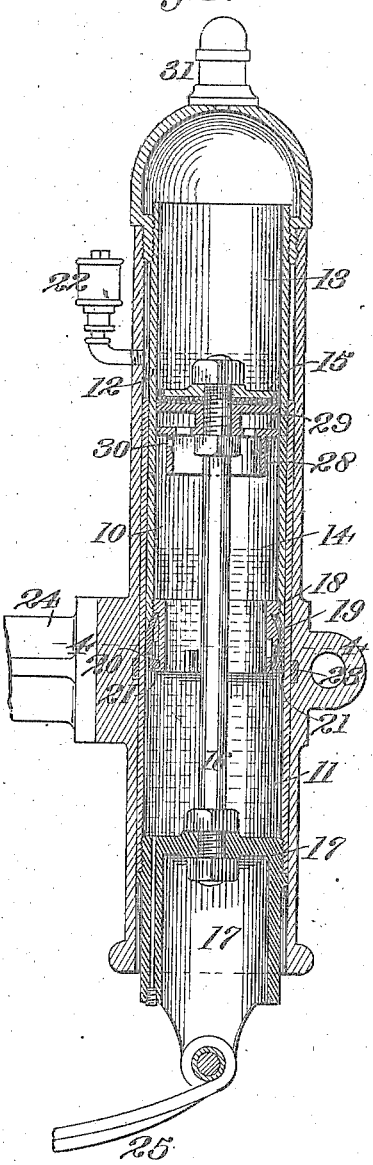
Fig.4.
WITNESSES:
Charles Rohls
J. A. Herring
INVENTOR
Lucien R. Gruss
BY Strong & Townsend
ATTORNEYS

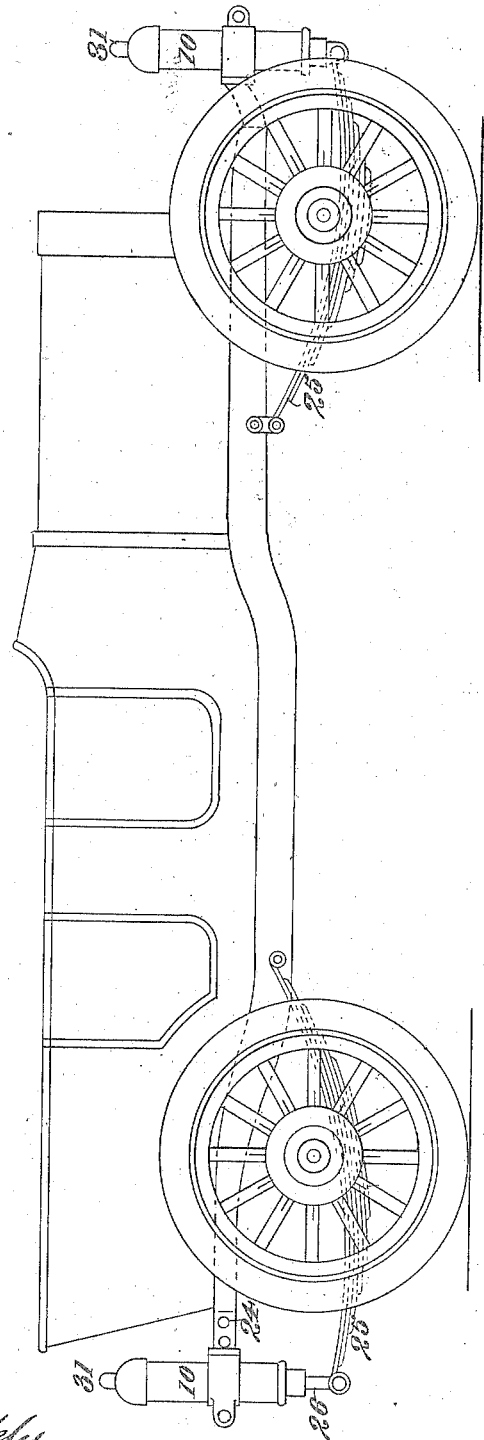
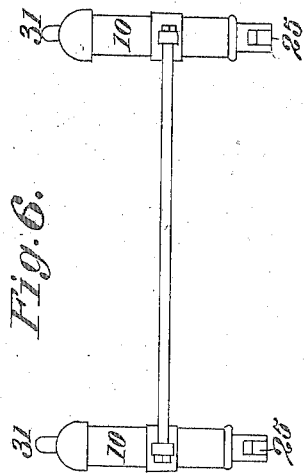

UNITED STATES PATENT OFFICE.

LUCIEN R. GRUSS, OF SAN FRANCISCO, CALIFORNIA, ASSIGNOR TO PNEUMATIC CUSHION CO., OF SAN FRANCISCO, CALIFORNIA, A CORPORATION OF CALIFORNIA.

AIR-SPRING.

1,216,254.  Specification of Letters Patent.  Patented Feb. 13, 1917.

Application filed September 6, 1916. Serial No. 118,627.

*To all whom it may concern:*

Be it known that I, LUCIEN R. GRUSS, a citizen of the United States, residing in the city and county of San Francisco and State of California, have invented new and useful Improvements in Air-Springs, of which the following is a specification.

This invention relates to pneumatic cushions of the type shown and described in my prior Patent No. 1,142,162, dated June 8, 1915.

The invention is designed particularly for use on heavy pleasure cars, auto trucks, and other vehicles for the purpose of giving the desired degree of resiliency and freedom from shock and vibration when traveling over rough roads and obstructions; this air spring being used in conjunction with or in lieu of the ordinary metal springs with which the car or truck, or other vehicle may already be equipped.

The present invention embodies essentially a pair of telescoping cylinders divided by a valveless piston carried by one cylinder having a sliding fit in the other; the space above the piston forming a cushion chamber containing the elastic medium like air, and also containing an oil seal against air leakage; the lower space or chamber containing a surplus of oil and lubricating the sliding joint between the two cylinders; no provision being made against the escape of any oil that may pass this sliding joint.

The chief function of the lower chamber or the chamber below the solid piston is that of a recoil check.

With the apparatus at rest and supporting its load, there is normally no pressure in the lower chamber. By reason of this peculiar construction of air spring in which a partitioning piston is employed, provision is made against excessive elongation of the air spring as occurs where two cylinders confine a cushioning medium in a single chamber. Such a construction of a single chamber without its partitioning piston results in producing such a degree of elasticity and rebound as to render the use of such springs dangerous in rounding curves or in traveling over rough roads at high speed.

Having reference to the accompanying drawings:

Figure 1 is a side elevation in partial section (the inner cylinder being shown in elevation) showing the rear end connection.

Fig. 2 is a view of the same spring in partial section at right angles to the position shown in Fig. 1.

Fig. 3 is a vertical section of the front spring and its connection with the front end of the vehicle.

Fig. 4 is a section on line 4—4 of Fig. 3.

Fig. 5 is a side elevation of the vehicle showing the invention applied.

Fig. 6 is an elevation representing a pair of springs as applied at an end of the vehicle.

The invention comprises essentially three cylinders 10—11—12, two of them 10 and 12 connected together at their upper ends and spaced apart to form a cylinder pocket for the intermediate lower sliding cylinder 11. The sliding cylinder 11 incloses with the inner cylinder 12, a space which is divided into two chambers 13—14 by a solid piston 15; the piston 15 being carried on rod 16 from the bottom or head 17 of the sliding cylinder 11.

A charge of oil or other suitable lubricant, is contained in the chamber 14, and an oil seal is maintained in chamber 13 over the packing of the piston 15. There is no connection nor communication between chambers 13—14 except as may be provided around the packing of the piston 15, that is between the piston 15 and the cylinder wall.

The sliding joint between the cylinders 12 and 11 is suitably packed to prevent excessive leakage from chamber 14. Preferably, I employ a ring 18 screwing into the lower end of the inner cylinder 12 and acting to support a cup leather 19, which projects below and over-hangs the end of the inner cylinder 12 and lies against the wall of the sliding cylinder 11.

A flat steel coil spring 20 encircles the lower end of the ring 18 and acts expansively against the cup leather to hold it in sliding contact with cylinder 11; a collar 21 serving to keep the spring in place on the ring. No particular claim is made to this coil spring in the present application, as it forms the subject-matter of an independent invention.

Experience shows that so little oil escapes past the sliding joint 19 that it is necessary to apply a lubricant from time to time through an oil cup 22 in order to provide sufficient lubrication between the sliding cylinder and the outer cylinder 10; a packing 23 preventing the escape of this added lubricant from between the cylinders.

Operation.

In putting these springs to use the outer cylinder 10 is attached to the body of the vehicle, as at 24, and the lower piston carrying cylinder 11 is suitably connected to the ordinary vehicle springs 25; the front springs 25 being direct connected usually as shown in Fig. 3, while the rear springs are usually connected with the air springs by means of a shackle 26 well known in the art. Lubrication to the shackle bearing 27 is taken care of by means of a port 28, Fig. 2, leading from the bearing upwardly and outwardly through the head 17 to the sliding joint between the cylinders 10—11; lubrication from these cylinders being sufficient to lubricate the shackle bearing.

The cylinders when charged with oil are compressed or telescoped one within the other to reduce the space therein to a minimum. That is, the piston 15 is shoved up as far as possible into the cylinder 12. This inward telescopic action obviously decreases the cubic contents of chamber 14. Oil is then charged into the cylinders to fill chamber 14 and to leave a small quantity of oil also standing in chamber 13 over the piston packing. Naturally any elongation of the cylinders will result in enlarging the chamber 14, due to the difference in diameters of the cylinders 11—12 below the piston. This increase in volumetric capacity of chamber 14 on elongation or rebound is taken advantage of by check recoil as will be later described.

After being charged with oil as above described, suitable air pressure to support the load is supplied to chamber 13 through an appropriate opening in the top controlled by cap 31.

Chamber 13 is the cushion chamber and chamber 14 below the piston in addition to forming an oil reservoir, has the purpose of forming a vacuum chamber acting on the under-side of the piston against rebound of the spring following a sudden compression of the air in the upper cushion chamber and a consequent rebound of the parts, as pressure on the compressed air is relieved. In other words, when the apparatus starts to expand, due to rebound, there is a counter-effect produced due to the presence of the piston within the cylinder, so that when the upper cylinder is moved upwardly on rebound it enlarges the space below the piston and produces a vacuum therein which tends to lift the portion of the load to which the lower cylinder is attached, and by that much tending to pull down the portion of the rebounding load to which the upper cylinder is attached. In short, the vehicle body, which is connected with the upper cylinder, and the chasis which is attached to the lower cylinder, will be caused by the present construction, to be pulled toward each other; being supported one above the other, by the compressed air in the upper cylinder, and not tending to be pushed apart as would be the case if the piston 15 was omitted and the parts were subject to the uncontrolled expansion of air in a chamber of largely increased capacity.

In the present case, every motion of the cylinders that tends to open them out, or to lengthen the air spring, due to the natural elasticity of the compressed air in the upper cylinder, produces a counter-force to create vacuum in the lower chamber tending to draw the parts together again; the point of approach of the body and chasis being determined by the volume of the compressed air in the upper cylinder. These opposing forces of vacuum in one chamber and expansion in the other, tends to bring the vibrating parts quickly to a station of rest.

Any replenishment of the oil seal above the piston is effected by the displacement in the lower chamber 14 below the piston due to the telescopic action of the cylinders; any excess of accumulation of oil in the lower chamber finding an outlet upwardly around the packing of the piston 15.

Depending from the underside of the piston 15 is a flange member 28 adapted to have a fairly snug telescoping fit with collar 18 on the extreme extension movement of the upper and lower cylinders; the object being to form between the flange 28 and the imperforate outer wall of a spider 29 to which it is attached, an oil trap which acts as a dash pot to check any tendency of the piston to impinge forcibly against the ring 18; there being provided a bleed port 30 in the wall of the flange 28 to allow for the slow escape of the oil and relieve any tendency of a sudden check of the moving parts by the entrapping of the oil in the dash pot.

An essential feature to the practical success of this spring is that when the cylinders are telescoped to their innermost dimensions the chamber 14 below the piston should be entirely filled with oil, or other liquid, so that there is practically no air or other elastic medium in chamber 14. The amount of sealing liquid in chamber 13 over the piston need only be such as to insure a liquid sealing joint for the piston packing.

The presence of air below the piston is inimical to the successful operation of the device; the entire cushioning action being in the upper chamber; the lower chamber being essentially a recoil check and a source of oil supply to seal the sliding joint between the cylinders and to replenish the oil seal above the piston as occasion may require.

Thus a condition prevails wherein the lower chamber is maintained normally at atmospheric pressure or below, while the upper chamber is sustained under high pressure, yet at long intervals and for an instant at a time the pressure in the lower chamber is momentarily raised to a point higher than that of the upper chamber in order that the leaked oil may be returned around the packing of the piston which is the only means of communication between the two chambers. A very short-lipped cup leather is used for the piston packing so that the pressure of the fluid above the piston is sufficient to keep the sliding joint between the piston and the cylinder tight.

The foregoing construction provides a simple, self-contained, stanch automatic air spring with a minimum of moving parts.

It is manifest that various changes in details of construction may be made without departing from the principle of the invention.

Having thus described my invention what I claim and desire to secure by Letters Patent is—

1. In an air spring comprising in combination telescoping cylinders closed at their outer ends and inclosing a space, a solid piston carried by the lower cylinder and working inside the upper cylinder and dividing said space into two chambers which are out of communication with each other except for such leakage as may take place around the piston packing, a body of oil contained in the cylinders of such quantity as to fill the lower chamber and to submerge the piston packing when the two cylinders are telescoped to their innermost limits, an annular packing carried by the inner cylinder and overhanging the lower end of the latter and in sliding contact with the outer cylinder and submerged in the liquid in the lower chamber and adapted to prevent leakage from the cylinders, the upper chamber forming a compression and cushioning chamber and the lower chamber acting on the extension of the cylinders to create a vacuum in the lower chamber to counteract the expansive action of the air spring.

2. In an air spring comprising in combination telescoping cylinders closed at their outer ends and inclosing a space, a solid piston carried by the lower cylinder and working inside the upper cylinder and dividing said space into two chambers which are out of communication with each other except for such leakage as may take place around the piston packing, a body of oil contained in the cylinders of such quantity as to fill the lower chamber and to submerge the piston packing when the two cylinders are telescoped to their innermost limits, an annular packing carried by the inner cylinder and overhanging the lower end of the latter and in sliding contact with the outer cylinder and submerged in the liquid in the lower chamber and adapted to prevent leakage from the cylinders, the upper chamber forming a compression and cushioning chamber and the lower chamber acting on the extension of the cylinders to create a vacuum in the lower chamber to counteract the expansive action of the air spring, and a dash pot connected with the piston and co-acting with the part on the cylinder in which the piston slides to check recoil.

3. In an air spring comprising telescoping inner upper, and lower outer, cylinders closed at their outer ends and inclosing a space, a piston working in the upper cylinder carried by the lower cylinder, and dividing said space into an upper chamber for compressible fluid and a lower chamber for incompressible fluid, a packing for the sliding joint between the cylinders, a ring on the lower end of the inner cylinder for retaining said packing in place and forming also a stop coöperating with the piston to limit the separating movement of said cylinders, and means forming a dash-pot between the piston and ring for restraining outward movement of the cylinders when they approach their limit of separation.

4. In an air spring comprising telescoping cylinders closed at their outer ends and inclosing a space, a piston working in the upper cylinder carried by the lower cylinder, a packing for the sliding joint between the cylinders, a dash pot with which the piston co-acts to check recoil, said dash pot being below the piston and coöperating with said packing means.

5. In an air spring, the combination of telescoping cylinders closed at their outer ends and inclosing a space, a piston carried by the lower cylinder and working inside the upper cylinder dividing said space into two chambers which are out of communication with each other except for such leakage as may take place around the piston packing, a body of oil contained within the cylinders of such quantity that when the cylinders are telescoped to their innermost limits the lower chamber is filled with oil, and the piston packing in the upper chamber is submerged to form an oil seal leaving an air cushion space above the oil in the upper cylinder, and a packed sliding joint between the cylinders, the upper chamber forming a compression and cushioning chamber, and the lower chamber acting on the extension of the cylinders to create a vacuum in the lower chamber to counteract the expansive action of the air spring.

6. In an air spring, the combination of telescoping cylinders closed at their outer ends and inclosing a space, a piston carried by the lower cylinder and working inside the upper cylinder dividing said space into two chambers which are out of communication with each other except for such leakage as may take place around the piston packing, a body of oil contained within the cylinders of such quantity that when the cylinders are telescoped to their innermost limits the lower chamber is filled with oil and the piston packing in the upper chamber is submerged to form an oil seal leaving an air cushion space above the oil in the upper cylinder, and a packed sliding joint between the cylinders, the upper chamber forming a compression and cushioning chamber, and the lower chamber acting on the extension of the cylinders to create a vacuum in the lower chamber to counteract the expansive action of the air spring, and an annulus connected and movable with the piston for co-acting with an annular part on the upper cylinder and below the piston to form a dash pot to check recoil.

In testimony whereof I have hereunto set my hand in the presence of two subscribing witnesses.

LUCIEN R. GRUSS.

Witnesses:
W. W. HEALEY,
M. E. EWING.